C. W. ASHLEY.
SENNIT.
APPLICATION FILED JULY 26, 1921.

1,433,868.

Patented Oct. 31, 1922.
2 SHEETS—SHEET 1.

WITNESS:
G. V. Rasmussen

INVENTOR
CLIFFORD W. ASHLEY
BY
Biesen Schrenk
ATTORNEYS

C. W. ASHLEY.
SENNIT.
APPLICATION FILED JULY 26, 1921.

1,433,868.	Patented Oct. 31, 1922.
2 SHEETS—SHEET 2.

WITNESS
G. V. Rasmussen

INVENTOR
CLIFFORD W. ASHLEY
BY
Briesen Schrenk
ATTORNEYS

Patented Oct. 31, 1922.

1,433,868

UNITED STATES PATENT OFFICE.

CLIFFORD W. ASHLEY, OF WILMINGTON, DELAWARE.

SENNIT.

Application filed July 26, 1921. Serial No. 487,804.

*To all whom it may concern:*

Be it known that I, CLIFFORD W. ASHLEY, a citizen of the United States, and resident of Wilmington, county of New Castle, State of Delaware, have invented certain new and useful Improvements in Sennits, of which the following is a specification.

My invention relates to sennits or plaited cordage and has for its object to provide a novel method whereby sennits of any desired cross-sectional shape may be plaited without the necessity for a core of any description and to provide a sennit which, regardless of its shape, is cross-plaited through its fabric and not hollow or tubular. Other more specific objects will appear from the description hereinafter and the features of novelty will be pointed out in the appended claims.

Figure 1:
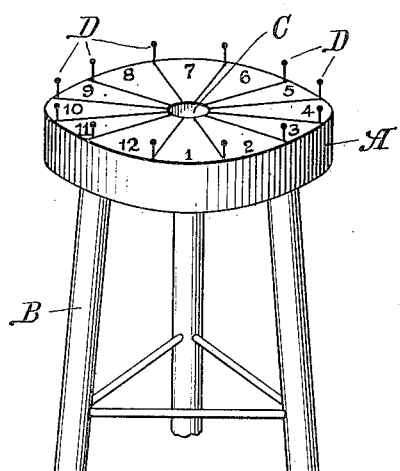
Figure 2:
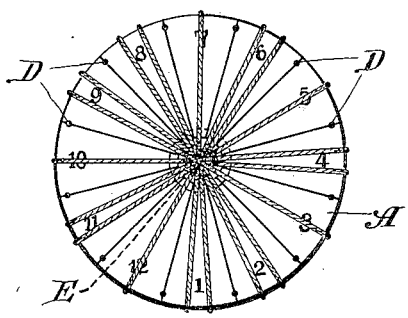
Figure 4:
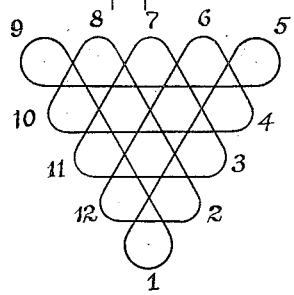
Figure 3:
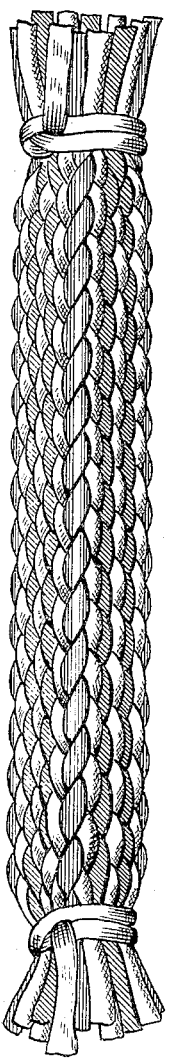

Reference is to be had to the accompanying drawings which illustrate several examples of my invention without defining its limits and in which Figure 1 is a perspective view of an apparatus or table which may be utilized for convenience in making the sennit by hand; Fig. 2 is a plan view showing the strands in place on said table at the beginning of a plaiting operation; Fig. 3 is a view of a sennit of triangular cross-section constructed in accordance with my invention; Fig. 4 is a diagrammatic cross-section thereof and Figs. 5, 6, 7, 8 and 9 are similar diagrammatic views illustrating sennits of various other cross-sectional forms.

For the purpose of describing the present invention I have chosen the method whereby a sennit of triangular cross-section is made, it being understood that this is only an example and that the selection is not to be construed as defining the limits of the invention. For convenience in making by hand I may employ the table illustrated in the drawings, which comprises a top A supported upon legs B and having an opening C at its central point; the top A may be laid off in a series of sections or divisions, each defined by a pin or the like D located near the periphery and whereby the strands used in plaiting may be kept in their intended positions free from interference with each other. The divisions or sections may be numbered, for instance, from 1 to 12 inclusive, for convenience in operating; these numbers will be utilized to indicate the strands in the description of the method.

The strands used in plaiting, the number of which depends upon the type and cross-sectional form of the sennit which is to be produced, radiate from the opening C and preferably are attached to a suitable weight E whereby the sennit is caused to pass downwardly through said opening C as it is completed.

Before commencing the description of the plaiting operations, it may be well to state that the cross-sectional form of the sennit may be determined on diagrams, as illustrated, the thickness between two opposite points on different surfaces of the sennit being determined by the number of lines intervening between the two corresponding points of the diagram, the shape of the finished sennit being identical with the form of the diagram upon which it is based. Furthermore, the lines in said diagrams always indicate the cross-sectional cycle of the strands in the finished sennit. In addition, it should be understood when directions are given to move a strand bearing a certain number that, in every case, the bottom or earliest strand to occupy the indicated position is referred to and must be moved left or right, according to whether it is an odd or an even number and in accordance with corresponding line in diagram. If an odd number, it must pass from the right side of its companion strand while if it is an even number, it must pass from the left of its companion strand. A given number refers always to the strand occupying the indicated position at the moment; when a strand changes its position it automatically changes its number correspondingly.

The triangular sennit chosen for illustration may be made with nineteen strands which, at the beginning of the operation, may be disposed upon the top A as indicated; that is to say, two strands are located in section 1; two in section 2; one in section 3; two in section 4; one in section 5; two in section 6; one in section 7; two in section 8; two in section 9; one in section 10; two in section 11; and one in section 12. The following sequence is preferably followed in the plaiting operation, it being understood that the start may be made at any point thereon. In describing the plaiting the strands will be referred to by the number of the section in which they are located.

One of the strands 9 is moved to 5 in a direction which is approximately to the right, after which one of the strands 4 is moved to 10 in a direction which is approximately to the left, this plan being followed throughout in the diagram; that is, moving the odd numbered strands approximately to the right and the even numbered ones approximately to the left, the indicated directions of movement of the strands applying to the diagram illustrated in Fig. 4 and in every instance hereinafter applying to the particular diagram illustrating the form of sennit being described. A strand 11 is now moved to 3 and then a strand 2 is moved to 12, after which a strand 1 is crossed over the strand previously moved from 2 to 12 and moved to 9, this being followed by a strand 8 being moved to 2. This strand 3, which originally occupied this space and not the one which was shifted thereto from 11 is now moved over to 7 so as to cross the strand previously shifted from 9 to 5. One of the strands 6 is then crossed over the same strand just referred to from the other direction to 4 and the strand 5, which originally occupied the indicated space, is moved to 1 and in doing so crosses the several strands located in the spaces 2, 3 and 4. The strand 12, which originally occupied this space, is now shifted to 6, after which the strand 7, which originally occupied the indicated space, is moved to 11, this being followed by moving the strand 10, originally positioned in this space, to 8, which completes a cycle.

The operation is repeated in successive cycles until the desired length of sennit has been completed, it being understood that each time the bottom or earliest strand to occupy a given position is moved to a new position, care being taken not to cross the other strand occupying the position from which the shift is made.

Figure 5:
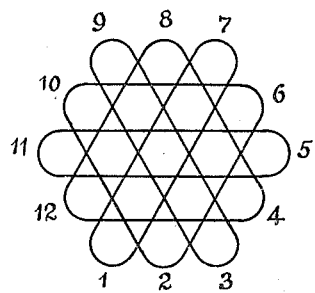

The sennit of hexagonal cross-section illustrated diagrammatically in Fig. 5 may be made with twenty strands, which at the beginning of the operation, may be disposed upon the top A of the table as follows: two strands in the section 1; one strand in section 2; two strands in section 3; one strand in section 4; two strands in section 5, 6 and 7; one strand in section 8; two strands in section 9; one strand in section 10, and two strands in each of the sections 11 and 12. While the following sequence is preferably followed in the plaiting operation, it will be understood that the start may be made at any point thereon just as in the operation previously described, the strands in this case also being referred to by the number of the sections from which they are shifted.

To begin, one of the strands 12 is moved to 8 in a direction which is approximately to the left, after which one of the strands 7 is moved to 1 in a direction which is approximately to the right, the even numbered strands in this instance also being all moved substantially to the left, while the odd numbered strands are shifted substantially to the right throughout the plaiting operation. The section 1 now contains three strands, so that one of the original strands occupying this section is now moved back to the section 7 to replace the one shifted therefrom. After this has been done a strand 6 is moved to 2 and the strand 2 which previously occupied this section is shifted to 10. As the next step, one of the strands 9 is brought over to 3, thus temporarily positioning three strands in this section, after which one of the original strands in said section 3 is moved back to 9 to replace the one moved therefrom. The strand which originally occupied the section 8 is now moved to 4 and the strand originally located in this section is shifted to 12. Following this, one of the strands 11 is moved to 5, thus temporarily bringing three strands into this section, and one of the original strands 5 is moved to 11 to replace the one taken therefrom; the cycle is completed by moving the strand which initially occupied the section 10 to the section 6.

In this form also the operation is repeated in successive cycles until the desired length of the sennit has been completed, it being understood that here also the bottom or earliest strand to occupy a given position is moved each time to a new position, care being taken not to cross any other strand located in the section from which the shift is made. A round sennit may be made on the hexagonal diagram by the introduction of certain additional strands (one additional at each even number point).

Figure 6:
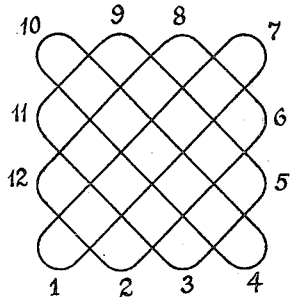

The sennit of rectangular cross-section illustrated diagrammatically in Fig. 6 may also be made with 20 strands which, at the beginning of the operation, may be located as follows upon the top A of the table; two strands in each of the sections 1 and 2; one strand in the section 3; two strands in each of the sections 4 and 5; one strand in the section 6; two strands in each of the sections 7 and 8; one strand in the section 9; two strands in each of the sections 10 and 11 and one strand in the section 12. In plaiting this square sennit the following sequence is followed, it being understood in this instance also that the start may be made at any point thereon.

To begin, one of the strands 2 may be moved to the section 12 and one of the strands 11 may be shifted to the section 3, after which one of the strands 4 may be moved to the section 10 and one of the two strands which originally occupied this section 10 shifted to the section 4 to replace the one removed therefrom. A strand 5 is then moved to the section 9 and a strand 8 transferred to the section 6, after which the strand 3, which initially occupied this position, is shifted to 5 and the strand 6, which was originally located in this section, is moved to the section 2. A strand 1 is now transferred to 7, thus temporarily locating three strands in this section, after which one of the original strands 7 is transferred to 1 to replace the one removed therefrom. The original strand 12 is now moved to 8 and the original strand 9 is moved to 11, thus completing one cycle.

The operation described is repeated in successive cycles as often as is necessary to produce the desired length of sennit, it being understood that in this case also the bottom or earliest strand to occupy a given position is moved each time to a new position without crossing any other strand located in the section from which the shift is made.

Figure 7:
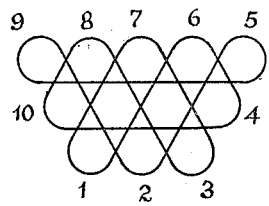

Another example of sennit is shown in Fig. 7 and is constructed of seventeen strands in a manner to have a half-round or semi-circular form in cross-section, the strands, at the commencement of the operation, being located in ten divisions of the top A, for instance, as follows: one strand in each of the sections 2, 4, 6 and 8; two strands in each of the sections 1, 3, 7, 9 and 10, and three strands in the section 5. In plaiting this form of sennit, the following sequence is followed, it being understood that in this case also the start may be made at any point thereon.

As a start, one of the strands 10 may be moved to 8 and one of the strands 7 shifted to 1, this being followed by transferring one of the two original strands 1 to 6 and one of the three strands at 5 to 2. The next step consists in moving the strand originally located at 2 to 9 and similarly shifting the original strand from 8 to 3, and then transferring a strand 3 to 7, this being followed by taking the strand which originally occupied the section 6 and moving it to 4. The strand originally located at 4 is now moved to 10 while one of the strands 9 is moved to 5, which completes one cycle.

The operation described is repeated in successive cycles as often as is necessary to produce the desired length of sennit, it being understood that in this case also the bottom or earliest strand to occupy a given position is moved each time to a new position without crossing any other strand located in the section from which the shift is made.

Figure 8:
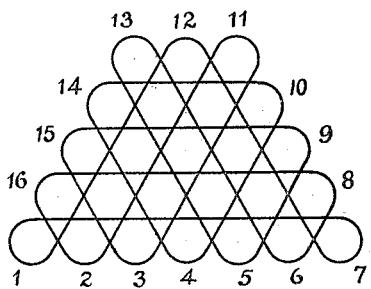

Another example of sennit constructed to have an isosceles trapezoidal form in cross-section is shown diagrammatically in Fig. 8 and is constructed of twenty-six strands which, at the commencement of the operation, are located upon the top A, for instance, as follows, the top in this case being divided into sixteen sections: one strand in each of the sections 3, 5, 7, 9, 14 and 16 and two strands in each of the sections 1, 2, 4, 6, 8, 10, 11, 12, 13 and 15. In plaiting this truncated triangular sennit, as it may be termed, the following sequence is followed, it being understood that in this case also the start may be made at any point thereon.

As a start, one of the strands 12 may be moved to 7 and one of the strands 6 shifted to 13, this being followed by transferring one of the strands 13 to 5 and one of the strands 4 to 14, and subsequently shifting a strand 15 to 3 and a strand 2 to 16, so that the sections 7, 5, 14, 3 and 16 now contain two strands and the section 13 three strands while the sections 12, 6, 13, 4, 15 and 2 contain only one strand each. The next step consists in moving a strand 1 to 12, this being followed by transferring one of the strands 11 to 2; this, in turn, is followed by passing the strand 3, which first occupied this section, to the section 11 and then moving one of the strands 10 to 4 to replace the one previously removed therefrom, after which the strand 5 which initially occupied the section, is moved over to 9 and a strand 8 is shifted to 6 to replace one of the strands previously taken from this section. The original strand 7 is now moved to 1, after which the original strand 16 is moved to 8 and the original strand 9 is transferred to 15, this being followed by moving the original strand 14 to 10, which completes one cycle.

To construct a given length of this form of sennit, the operation is also repeated in as many successive cycles as may be necessary, it being understood that in this form, as in the forms previously described, the bottom or earliest strand to occupy a given position is moved each time to a new position without, however, crossing any other strand which may be located in the section from which the shift is made. In this form, a strand entering at an odd number space should always be placed at the left of the strand or strands already there, and the right-hand strand is always the one to move from an odd numbered section or space, the opposite being true of the even numbers. Furthermore, in this example, odd numbers move to both odd and even numbered sections.

Figure 9:
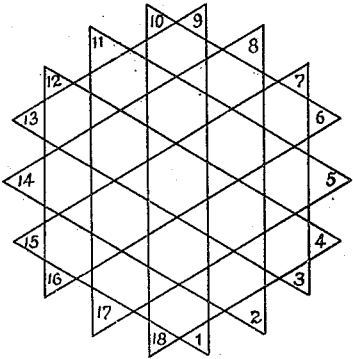

The round sennit chosen as another example and illustrated in Fig. 9 is made with twenty-seven strands which, at the beginning of the operation, may be disposed upon the top A, for instance, as follows, said top A, in this case, being divided into eighteen sections; that is to say, two strands are located in section 1; one in section 2, two in section 3; two in section 4; one in section 5; two in section 6; one in section 7; two in section 8; one in section 9; one in section 10; two in section 11; one in section 12; one in each of the sections 13, 15 and 17, and two strands in each of the sections 14, 16 and 18.

The following sequence is preferably followed in the plaiting operation, it being understood that here also the start may be made at any point thereon.

A strand 16 is shifted to 12 and a strand 11 to 17, after which a strand 18 is moved to 10, this being followed by transferring a strand 1 to 9; as the next step, a strand 8 is moved to 2 and a strand 3 to 7, and then a strand 4 is shifted to 18. The strand which originally occupied the section 17 is now moved to 5 and a strand 6 is transferred to 16, this being followed by moving the original strand 7 to 15 and a strand 14 to 8, and then transferring the original strand 9 to 13, the original strand 10 to 6 and the original strand 5 to 11. The next step consists in moving the original strand 12 to 4 and the strand first located at 13 to 3, and then shifting the original strand 2 to 14 and the original strand 15 to 1, this completing one cycle.

The operation in this form also is repeated in successive cycles until the desired length of sennit has been completed, it being understood that each time the bottom or earliest strand to occupy a given position, is moved to a new position, care being taken not to cross the other strand occupying the position from which the shift is made.

The six examples of sennits of different cross-sectional form are illustrative of the possibilities of the invention and are in no sense to be construed as defining its limits, it being understood that sennits of other cross-sectional forms may be constructed and also that the sennits illustrated may be produced with a greater or lesser number of strands in varying dimensions.

In every instance the cross-section of the sennit may be determined by means of a diagram, the thickness between two points on the diagram being decided by the number of lines intervening between the same, and the shape of the finished sennit being identical with the shape of the diagram upon which it is based; the lines of the diagrams correspond with the cross-sectional cycle of the strands in the finished sennit.

In plaiting a sennit of any given cross-sectional form the strands are interwoven so as to cross each other interiorly of the sennit in at least two different directions and in some of the forms in three or more different directions. In every instance, the strands lying in the same line are moved successively in sets and the different sets of strands are worked progressively in rotation, spiralling either to the left or to the right, as the case may be; that is to say, the plaiting results in a solid sennit comprising a plurality of strands passing from face to face in regular order, each strand crossing the sennit in the interior thereof in at least two directions and there being not less than three strands in a radial direction from the centre to an edge of the sennit. By "centre" is meant that point which is the geometrical point of the sennit when viewed in cross-section, while the term "radial direction" is intended to indicate any line extending from said centre to the surface of the sennit. The term "edge" is used with reference to the meeting point of two adjacent surfaces or to the equivalent point in a sennit of round, oval or other similar cross-sectional shape.

The sennit, in every case, being solid throughout and minus a core of any kind, its shape being determined entirely by the method of plaiting, makes a strong and closely plaited sennit admirably adapted for use as a fish line, curtain cord, bell and brake rope, shoe strings and lacings of all kinds. When constructed of triangular and isosceles trapezoidal form it provides a rope-driving belt of maximum efficiency; the sennit, in all of its forms, because it has a predetermined, inherent shape, is also well adapted for use as gaskets or packings of any type. The sennit is highly decorative, and being exceedingly strong, is desirable also for use in chair, basket and braid making, in upholstery, interior decoration, curtain cords, loops and fastenings, lace making, needlework, etc.; to increase the decorative effect strands of different colors may be employed. These will appear at regular intervals on the surface. Every strand in the sennit, regardless of its form, appears at regular intervals upon the exposed surface or surfaces and receives an equal wear so that the sennit has a maximum period of usefulness. The surface of the sennit may be varied by adding strands at every numbered point of the diagram; similarly, the corners of the sennits in which corners appear may be accented or rendered bulkier by introducing a still further set of corner strands. There is substantially no limit to the size in which any of the varieties of the present sennit may be made.

Various changes in the specific forms shown and in the number of strands employed and described may be made within the scope of the claims without departing from the spirit of my invention.

I claim:

1. A solid sennit comprising a plurality of strands passing from face to face in regular order, each strand crossing the sennit in the interior thereof in at least two directions, there being not less than three strands in a radial direction from the centre to an edge of said sennit.

2. A solid sennit comprising a plurality of strands passing from face to face in regular order and extending helically throughout said sennit, each strand crossing the sennit in the interior thereof in at least two directions, there being not less than three strands in a radial direction from the centre to an edge of said sennit.

3. A solid sennit comprising a plurality of strands passing from face to face in regular order and each appearing at regular intervals upon the outer surface of said sennit, each strand crossing the sennit in the interior thereof in at least two directions, there being not less than three strands in a radial direction from the centre to an edge of said sennit.

4. A solid sennit comprising a plurality of strands passing from face to face in regular order, each strand crossing the sennit in the interior thereof in at least two directions, there being not less than three strands in a radial direction from the centre to an edge of said sennit, and additional strands plaited in said sennit to increase the bulk thereof at predetermined points.

5. The method of making sennits which consists in connecting a plurality of strands at one end, arranging said strands singly and in groups and on its turn taking one strand from a group of two or more and laying it transversely in the interior of the sennit into juxtaposition with a group of one or more strands at an opposite point in said sennit, all of the strands being moved in successive order.

6. The method of making sennits which consists in connecting a plurality of strands at one end, arranging said strands singly and in groups of two or more, and in its turn taking one strand from a group of two or more and laying it transversely in the interior of the sennit into juxtaposition with a group of one or more strands at an opposite point in said sennit, so that at all times during the process of manufacture one strand at least occupies each group position or point, all of the strands being moved in successive order.

7. The method of making sennits which consists in connecting a plurality of strands at one end, arranging said strands singly and in groups of two or more, plaiting the strands of each group in turn and successively to lay it transversely in the interior of the sennit into juxtaposition with a group of one or more strands at an opposite point in said sennit and working the groups of strands progressively in rotation to cause the strands to spiral throughout the length of said sennit.

8. The method of making sennit of polygonal cross-section which consists in connecting a plurality of strands at one end, arranging said strands singly and in groups of two or more, taking one of the strands from a group of two or more and laying it transversely of the sennit into juxtaposition with a group of one or more at an opposite point thereof and introducing an additional set of corner strands and plaiting them in the same way to increase the dimensions of said sennit at the corners thereof.

In testimony whereof I have hereunto set my hand.

CLIFFORD W. ASHLEY.